Patented Oct. 20, 1953

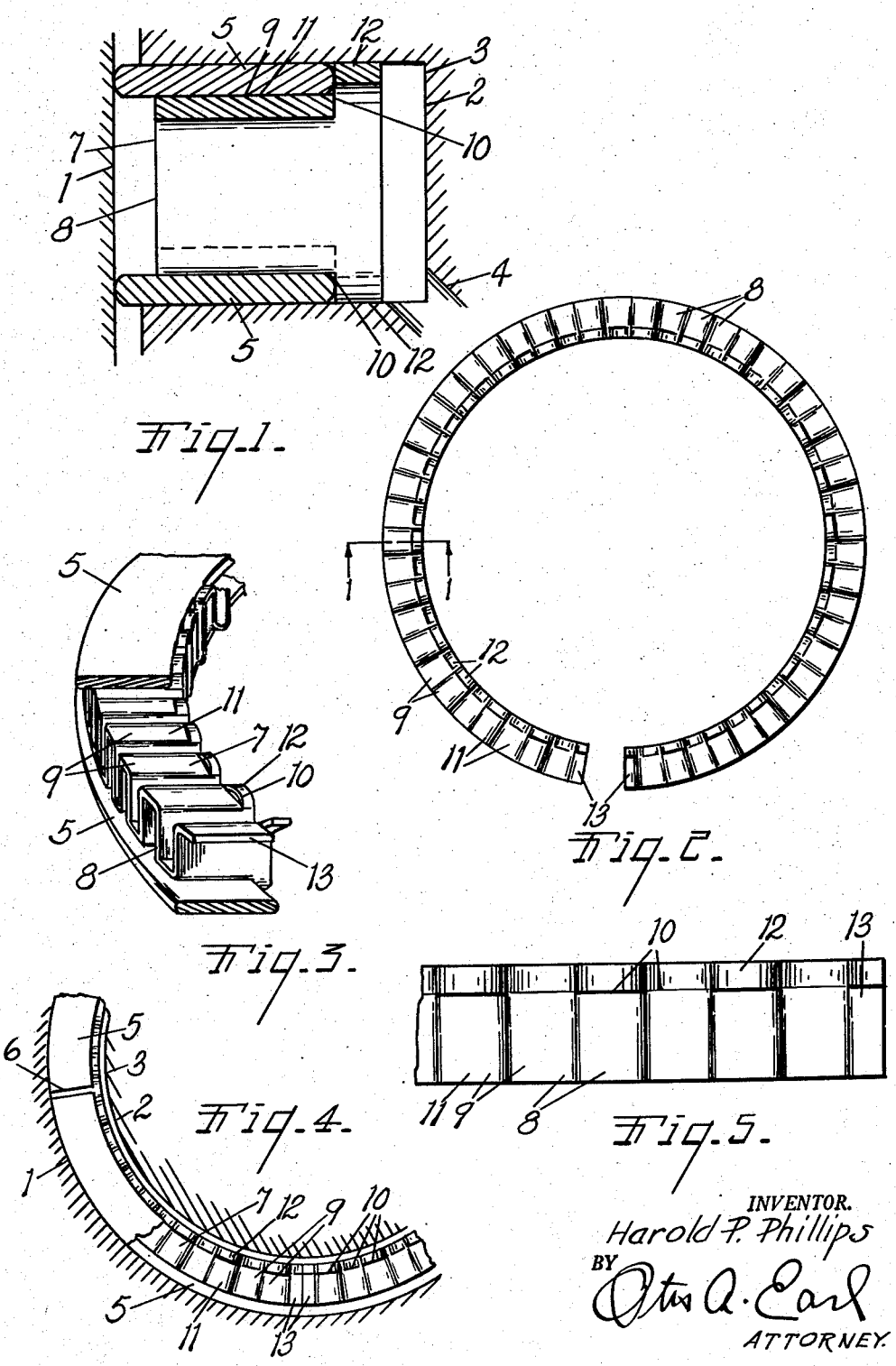

2,656,230

UNITED STATES PATENT OFFICE 2,656,230

PISTON RING ASSEMBLY AND ELEMENTS THEREOF

Harold P. Phillips, Hastings, Mich., assignor to Hastings Manufacturing Company, Hastings, Mich.

Application September 10, 1951, Serial No. 245,835

9 Claims. (Cl. 309—29)

This invention relates to improvements in piston ring assembly and elements thereof.

The main objects of this invention are:

First, to provide a piston ring assembly which is adapted for installation in piston ring grooves of varying depths.

Second, to provide a piston ring assembly comprising cylinder wall engaging elements and a combined intermediate spacer and expander which supports and subjects the cylinder wall engaging elements to substantially uniform springable radial thrust.

Third, to provide a piston ring assembly having these advantages which may be very economically produced and is easily installed with little likelihood of distortion or injury thereto during installation.

Fourth, to provide an annular combined spacer and expander element formed of resilient ductile ribbon metal stock which springably supports and the associated cylinder wall engaging elements throughout and without regard to the depth of the groove in which the assembly is installed.

Objects relating to details and economies of the invention will appear from the description to follow. The invention is defined and pointed out in the claims.

Fig. 1 is a fragmentary longitudinal section of a cylinder and associate piston with the ring assembly of my invention installed therein, the cylinder and piston being shown conventionally and without regard to the relative dimensions. The parts shown greatly enlarged and without regard to clearances and tolerances.

Fig. 2 is a side elevational view of the intermediate combined spacer and expander member in its relaxed position.

Fig. 3 is a fragmentary perspective view of the assembly.

Fig. 4 is a fragmentary transverse sectional view illustrating the assembly as installed in a piston ring groove and associated with a cylinder wall.

Fig. 5 is an enlarged side elevational view conventionally illustrating details of the combined expander and spacer member prior to the coiling thereof into the form shown in Fig. 2.

In the accompanying drawing, 1 represents a cylinder and 2 a piston with a piston ring groove 3 therein, the groove 3 is provided with a drain opening 4. No attempt has been made to show these parts in their relative proportions or the clearances or tolerances between the parts as the main purpose is to show the relation of the ring assembly in the ring groove of the piston and cylinder.

The ring assembly of my invention comprises annular split cylinder wall engaging members 5—5 which are formed of ribbon steel coiled edgewise. These elements are split as indicated at 6 in Fig. 4. The combined spacer and expander element designated generally by the numeral 7 is formed of resilient ductile metal desirably ribbon steel stock corrugated sidewise to provide a plurality of uniformly spaced corrugations 8. The bight portions 9 of the corrugations have transverse slits 10 therein, the portions 11 of the corrugation above the slits flattened to provide axial support members for the cylinder wall engaging elements. The portions of the bights below the corrugations project beyond the flattened portions to form supporting abutment 12 for the cylinder wall engaging elements coacting with the inner edges thereof. The corrugations provide an annular series of spring elements which are under compressive stress when the assembly is installed in a piston ring groove in coacting relation to the cylinder wall as indicated in Fig. 4 with the ends 13 of the member 7 in abutting relation as there illustrated.

The elements 7 may be formed very uniformly in commercial production which is a highly desirable factor. The amount of radial thrust desired can be controlled quite accurately by the gauge and the radial width and the inherent resilience of the stock. The spring expanding action is uniform throughout.

The parts of the three piece assembly may all be formed of ductile metal ribbon stock. They are not likely to be injured or distorted in installing.

I have illustrated and described my invention in a highly practical embodiment thereof. I have not attempted to illustrate or describe other adaptations or modifications as it is believed that this disclosure will enable those skilled in the art to embody or adapt my invention as may be desired.

Having thus described my invention, what I claim as new and desire to secure by Letters Patent is:

1. A piston ring assembly comprising, axially spaced annular split expansible cylinder wall engaging elements formed of ductile ribbon metal coiled edgewise, and an annular split resilient combined spacer and expander intermediate member formed of ductile ribbon metal corrugated sidewise and disposed radially edgewise between the cylinder wall engaging elements, the bight portions of the corrugations having transverse slits spaced from but adjacent to their inner edges, the bight portions radially outward from said slits being flattened and being in side supporting relation to the cylinder wall engaging elements, portions of the bights below said flattened portions constituting radial thrust abutments coacting with the inner edges of the cylinder wall engaging elements, the said intermediate member being under springable compression with its ends in abutting relation when the assembly is installed in a piston ring groove.

2. A piston ring assembly comprising axially spaced annular split expansible cylinder wall engaging elements formed of ductile ribbon metal coiled edgewise, and an annular split resilient combined spacer and expander intermediate member formed of ductile ribbon metal corrugated sidewise and disposed radially edgewise between the cylinder wall engaging elements, with portions of the bights thereof in axial supporting relation to the cylinder wall engaging elements, other inner portions of said bights having radial thrust abutments engaging the inner edges of the cylinder wall engaging elements, said intermediate member being under springable compression with its ends in abutting relation when the assembly is installed in a piston ring groove.

3. A piston ring assembly comprising axially spaced expansible cylinder wall engaging side members, and a split annular resilient combined spacer and expander intermediate member formed of resilient ductile metal and having axial corrugation therein, the bights of said corrugations being in axial supporting relation to the cylinder wall engaging elements and provided with axially projecting portions constituting radial thrust abutments coacting with the inner edges of the cylinder wall engaging elements, the corrugations of said intermediate member constituting an annular connected series of spring elements when the assembly is installed in a piston ring groove with the intermediate member under annularly springable compression and with its ends in abutting relation.

4. A piston ring assembly comprising axially spaced expansible cylinder wall engaging elements, and a split annular resilient combined spacer and expander intermediate member formed of resilient ductile metal and having axial corrugation therein providing an annular series of connected annularly springable elements when the assembly is installed in a piston ring groove with the ends of the intermediate member in abutting relation, the bights of said corrugations being in axial supporting relation to the cylinder wall engaging elements and provided with axially projecting portions constituting radial thrust abutments coacting with the inner edges of the cylinder wall engaging elements.

5. A piston ring assembly comprising an expansible cylinder wall engaging member and an annular resilient member formed of springable ductile metal corrugated sidewise providing an annular series of connected annularly springable elements and disposed with corresponding bights thereof in axial supporting relation to the cylinder wall engaging element, the said bights having abutment portions engaging the inner edges of the cylinder wall engaging member, the said corrugations permitting annularly springable compression of said member when installed in a piston ring groove with the ends thereof in abutting engagement.

6. An annular split resilient combined piston ring element spacer and expander member formed of springable ductile ribbon metal corrugated sidewise, the bight portions of the corrugations having transverse slits spaced from but adjacent to their inner edges, the bight portions radially outward from said slits being flattened for side supporting engagement with cylinder wall engaging elements associated therewith, portions of the bights below said flattened portions constituting radial thrust abutments adapted to coact with the inner edges of the cylinder wall engaging elements, the said member being springably compressible with its ends in abutting relation.

7. An annular split combined spacer and expander piston ring element for use with a split expansible cylinder wall engaging member, consisting of a flat strip of resilient ductile metal of uniform width corrugated sidewise, the corrugations providing an annular series of connected annularly springable elements of a radial width corresponding to the width of the strip, the bights of the corrugations being flattened and the inner edge portions thereof projecting axially beyond the flattened portions and constituting radial thrust abutments for piston ring members disposed therearound and in axial supported relation to said flattened portions, the annular series of springable elements acting to springably support piston ring members when installed in a piston ring groove with the ends of the element in abutting relation.

8. An annular split combined spacer and expander piston ring element for use with a split expansible cylinder wall engaging member formed of a flat strip of resilient ductile metal of uniform width corrugated sidewise, the corrugations providing an annular series of connected annularly springable elements of a radial width corresponding to the width of the strip, bights of the corrugations having inner edge portions thereof projecting axially and constituting radial thrust abutments for a piston ring member disposed therearound and in axial supported relation to the said bights, the annular series of springable member elements acting to springably support a piston ring when installed in a piston ring groove with the ends of the element in abutting relation.

9. A piston ring assembly comprising axially spaced annular split expansible cylinder wall engaging elements formed of ductile ribbon metal coiled edgewise, and an annular split resilient combined spacer and expander intermediate member formed of ductile ribbon metal of uniform width corrugated sidewise providing bights of a width corresponding to the radial width of the ribbon and disposed radially edgewise between the cylinder wall engaging elements, with portions of the bights thereof in axial supporting relation to the cylinder wall engaging elements, inner edge portions of said bights having radial thrust abutments engaging the inner edges of the cylinder wall engaging elements.

HAROLD P. PHILLIPS.

References Cited in the file of this patent

UNITED STATES PATENTS

| Number | Name | Date |
|---|---|---|
| 2,309,477 | Phillips | Jan. 26, 1943 |
| 2,390,044 | Bowers | Dec. 4, 1945 |

FOREIGN PATENTS

| Number | Country | Date |
|---|---|---|
| 555,348 | Great Britain | Aug. 18, 1943 |